(12) United States Patent
Doumet

(10) Patent No.: US 12,206,727 B2
(45) Date of Patent: Jan. 21, 2025

(54) SYSTEMS AND METHODS FOR DISPLAYING ADS ON A MOBILE DEVICE OUTSIDE OF A MOBILE APP

(71) Applicant: ADENDA MEDIA INC., Vancouver (CA)

(72) Inventor: Francis George Doumet, Vancouver (CA)

(73) Assignee: ADENDA MEDIA INC., Vancouver (CA)

(*) Notice: Subject to any disclaimer, the term of this patent is extended or adjusted under 35 U.S.C. 154(b) by 166 days.

(21) Appl. No.: 17/093,875

(22) Filed: Nov. 10, 2020

(65) Prior Publication Data

US 2021/0058452 A1 Feb. 25, 2021

Related U.S. Application Data

(63) Continuation of application No. 15/847,520, filed on Dec. 19, 2017, now Pat. No. 10,834,174, which is a
(Continued)

(51) Int. Cl.
*G06Q 30/02* (2023.01)
*G06F 3/0481* (2022.01)
(Continued)

(52) U.S. Cl.
CPC .......... *H04L 67/10* (2013.01); *G06F 3/04817* (2013.01); *G06F 3/0482* (2013.01);
(Continued)

(58) Field of Classification Search
None
See application file for complete search history.

(56) References Cited

U.S. PATENT DOCUMENTS

2002/0059363 A1 5/2002 Katz et al.
2002/0082913 A1* 6/2002 Li ...................... G06Q 30/0264
705/14.61
(Continued)

FOREIGN PATENT DOCUMENTS

EP 2224323 A1 9/2010
KR 10-2010-0057461 A 5/2010
(Continued)

OTHER PUBLICATIONS

AppBrain, "AppBrain AppLift SDK Overview", Retrieved from Internet at: <http://web.archive.org/web/20120605000804/http:/www.appbrain.com:80/info/sdk> on Feb. 7, 2019, archived Jun. 5, 2012.
(Continued)

*Primary Examiner* — Vincent M Cao
(74) *Attorney, Agent, or Firm* — MARSHALL, GERSTEIN & BORUN LLP

(57) ABSTRACT

Systems and methods for displaying mobile ads on a mobile device of a user are disclosed. In various embodiments, a mobile application (app) is provided to the mobile device for installation, where the mobile app is configured to display mobile ads to a device screen of the mobile device. A server communicatively coupled to the mobile device tracks a reward associated with the user where the reward is based on enabling the mobile device to receive mobile ads. The server transmits one or more mobile ads to the mobile device, which, upon receipt at the mobile device, causes the mobile app to display the one or more mobile ads outside of the mobile app.

20 Claims, 6 Drawing Sheets

Related U.S. Application Data continuation of application No. 14/477,834, filed on Sep. 4, 2014, now Pat. No. 9,923,953, which is a continuation-in-part of application No. 14/153,014, filed on Jan. 11, 2014, now Pat. No. 9,619,824.

(60) Provisional application No. 61/860,688, filed on Jul. 31, 2013.

(51) Int. Cl.
| | | |
|---|---|---|
| *G06F 3/04817* | (2022.01) | |
| *G06F 3/0482* | (2013.01) | |
| *G06F 8/70* | (2018.01) | |
| *G06Q 30/0251* | (2023.01) | |
| *H04L 67/10* | (2022.01) | |
| *G06Q 30/0207* | (2023.01) | |
| *G06Q 30/0241* | (2023.01) | |

(52) U.S. Cl.
CPC ............ *G06F 8/70* (2013.01); *G06Q 30/0267* (2013.01); *G06Q 30/0207* (2013.01); *G06Q 30/0241* (2013.01); *G06Q 30/0269* (2013.01)

(56) References Cited

U.S. PATENT DOCUMENTS

| | | | |
|---|---|---|---|
| 2002/0120925 A1 | 8/2002 | Logan | |
| 2003/0040970 A1 | 2/2003 | Miller | |
| 2003/0050837 A1 | 3/2003 | Kim | |
| 2003/0229514 A2 | 12/2003 | Brown | |
| 2004/0172340 A1 | 9/2004 | Bishop et al. | |
| 2005/0038699 A1 | 2/2005 | Lillibridge et al. | |
| 2005/0125307 A1 | 6/2005 | Hunt et al. | |
| 2006/0069616 A1 | 3/2006 | Bau | |
| 2006/0253453 A1* | 11/2006 | Chmaytelli | H04W 4/029 |
| 2007/0179792 A1 | 8/2007 | Kramer | |
| 2008/0004952 A1 | 1/2008 | Koli | |
| 2008/0098420 A1 | 4/2008 | Khivesara et al. | |
| 2008/0168099 A1 | 7/2008 | Skaf | |
| 2008/0294515 A1* | 11/2008 | Rupp | G06Q 30/0239 |
| | | | 705/14.39 |
| 2009/0070190 A1 | 3/2009 | Gorty et al. | |
| 2009/0089131 A1 | 4/2009 | Moukas et al. | |
| 2009/0125510 A1* | 5/2009 | Graham | G06V 30/1916 |
| | | | 707/999.005 |
| 2010/0024010 A1 | 1/2010 | Baugher et al. | |
| 2010/0114706 A1 | 5/2010 | Kosuru | |
| 2010/0287035 A1* | 11/2010 | Nemitz | G06Q 30/0255 |
| | | | 705/14.66 |
| 2011/0238495 A1 | 9/2011 | Kang | |
| 2011/0258024 A1* | 10/2011 | Prince | G06Q 30/0269 |
| | | | 705/14.66 |
| 2011/0275354 A1* | 11/2011 | Akhter | G01C 21/3697 |
| | | | 455/414.1 |
| 2011/0320300 A1 | 12/2011 | Broms et al. | |
| 2012/0096431 A1 | 4/2012 | Madar | |
| 2012/0130801 A1 | 5/2012 | Baranov et al. | |
| 2012/0232985 A1 | 9/2012 | Lasker et al. | |
| 2012/0253939 A1 | 10/2012 | Grigoriev et al. | |
| 2012/0259707 A1 | 10/2012 | Thielke et al. | |
| 2013/0019296 A1 | 1/2013 | Brandenburg | |
| 2013/0124276 A1* | 5/2013 | Brown | G06Q 30/0267 |
| | | | 705/14.4 |
| 2013/0231043 A1* | 9/2013 | Tawfiq Moshtaha | H04W 4/90 |
| | | | 455/3.01 |
| 2013/0304580 A1* | 11/2013 | Feadler | G06Q 30/0266 |
| | | | 705/14.64 |
| 2013/0326477 A1* | 12/2013 | Wyatt | G06Q 30/0241 |
| | | | 717/120 |
| 2014/0019253 A1 | 1/2014 | Ricasata | |
| 2014/0222568 A1* | 8/2014 | Weitzman | G06Q 30/0259 |
| | | | 705/14.57 |
| 2015/0120458 A1 | 4/2015 | Lee et al. | |

FOREIGN PATENT DOCUMENTS

| | | | | |
|---|---|---|---|---|
| KR | 20140000038 A | * | 1/2014 | ......... G06Q 30/0267 |
| WO | WO-0223444 A1 | * | 3/2002 | ............. G06Q 30/02 |
| WO | WO-2007148171 A2 | * | 12/2007 | ........... G06F 16/955 |

OTHER PUBLICATIONS

Tapjoy, "Building Successful Free-to-Play Apps on Android", Retrieved from Internet at: <https://www.slideshare.net/Tapjoy/adc-tapjoykeynote>, published Jun. 7, 2012.

* cited by examiner

SYSTEMS AND METHODS FOR DISPLAYING ADS ON A MOBILE DEVICE OUTSIDE OF A MOBILE APP

CROSS-REFERENCE TO RELATED APPLICATIONS

This application is a continuation of U.S. application Ser. No. 15/847,520 filed Dec. 19, 2017, entitled "SYSTEMS AND METHODS FOR DISPLAYING ADS ON A MOBILE DEVICE OUTSIDE OF A MOBILE APP," which is a continuation of U.S. application Ser. No. 14/477,834 filed Sep. 4, 2014, entitled "EXTENDING MOBILE APPLICATIONS TO THE LOCK SCREEN OF A MOBILE DEVICE," now U.S. Pat. No. 9,923,953, which is a continuation-in-part of U.S. application Ser. No. 14/153,014 filed on Jan. 11, 2014, entitled "DISPLAYING ADS ON A MOBILE DEVICE OUTSIDE OF A MOBILE APP," now U.S. Pat. No. 9,619,824, which claims the benefit of U.S. Provisional App. No. 61/860,688, filed on Jul. 31, 2013, entitled "SYSTEM AND METHOD FOR DISPLAYING ADVERTISEMENTS ON A MOBILE DEVICE FROM OUTSIDE OF THE CONFINES OF A MOBILE SOFTWARE APPLICATION." The entirety of each of the foregoing applications is incorporated by reference herein.

BACKGROUND OF THE INVENTION

Field of the Invention

The present invention relates to software and mobile devices. More specifically, it relates to software for displaying content from an app on a lock screen of a mobile device.

Description of the Related Art

One drawback of current app execution on mobile devices is related to how app content, such as notifications, is communicated to users. As is presently known to users of apps on mobile devices, the most prevalent way for mobile apps today to engage or communicate with a user from outside the app (i.e., while the user does not have the app open or executing on the device) is through a mobile notification. Conventionally, a mobile notification is a combination of an icon (or an icon/text combination) representing the app that appears either in a "notification bar" located at the top of the home screen of a mobile device or, in another embodiment, in the center of the lock screen of a mobile device.

FIG. 1 shows a mobile device 102 having a display 104 showing a lock screen 106. At the bottom of lock screen 106 is a notification bar 108 which shows icons indicating notifications from apps when the device is in lock screen mode. As noted above, these icons convey minimal information to the user and are often ignored. Presently, they are the only way for an app to display any content to the user when the device is in lock screen mode.

Limiting such notifications (which are essentially communications to a user when an app is closed) to a single icon limits user interaction with the app; the user sees the same mobile notification from an app regardless of the nature or importance of the communication from the app. For example, a calendaring app presently has to show the same notification (on a lock screen or home screen) for a routine weekly meeting as it would for an emergency alert or urgent appointment. The nature of one notification is more important than the other but the user sees the same graphical icon/text for both.

Furthermore, notification icons from different mobile apps may also look similar and some are nearly identical, making them difficult to distinguish and set apart from each other. In addition, because the notification icon itself is not interactive, the user has to perform additional steps to engage with the notification content, for example, tapping on the notification to launch the app that sent it. As a result, many users simply dismiss conventional notifications altogether.

Another conventional tool for addressing communications from apps displayed on a home screen of a device is the use of home screen widgets. As known in the art, these are app components that can be placed on a home screen of a device, but similar to notifications, they provide limited interaction capabilities, such as music player controls, or a combination of text and images that have to be clicked in order to open the corresponding app in order to interact with the content displayed on the home screen.

As noted, mobile app notifications are typically a static image. Because this content is neither dynamic nor interactive, conventional notifications do not perform well in capturing user attention or generating user interaction. It would be desirable to be able to provide descriptive, media-rich, and potentially interactive content, including notifications, to mobile app users on a device lock screen or home screen even when the app is closed.

SUMMARY OF THE INVENTION

One aspect of the present invention is a method of displaying app content from an app on a screen, such as a lock screen or home screen, of a mobile device. It enables content, such as app notifications, to be displayed even when the app is closed and, as noted, to have the content displayed on a lock screen or home screen. In one embodiment, a content request is created by the native app software. This request is transmitted to a special software development kit (SDK) of the present invention that is specifically for retrieving and displaying app content on a lock screen of a device. Upon receiving the request, the SDK first determines whether the app has permission and/or priority to display content on the lock screen or home screen. If the app does, in one embodiment, the SDK creates a second content request which is transmitted over a network, primarily the Internet, to a content server. In another embodiment, a second request is not needed and the content to be displayed is retrieved from the app itself.

Following the first embodiment, the app content, such as a notification, is retrieved from a database on the server using criteria or constraints such as date/time, geographic location, and device motion pattern. The content can be interactive, engaging, full-screen, and media-rich; it can include HTML, videos, images, URLs, and other content. The app/device receives the content from the server (in response to the second content request) and displays the content on the device screen. In the second embodiment, the content is retrieved from the app itself and displayed on the screen. In this second embodiment, some of the same constraints or criteria of the first embodiment can be used.

In another embodiment, the SDK computes a priority of the app with respect to other apps attempting to display app content on the lock screen. This can be done by examining an app queue position, frequency of app usage, and other constraints such as date, geographic location, and device motion patterns.

BRIEF DESCRIPTION OF THE DRAWINGS

References are made to the accompanying drawings, which form a part of the description and in which are shown, by way of illustration, specific embodiments of the present invention.

DETAILED DESCRIPTION OF THE INVENTION

Figure 3:
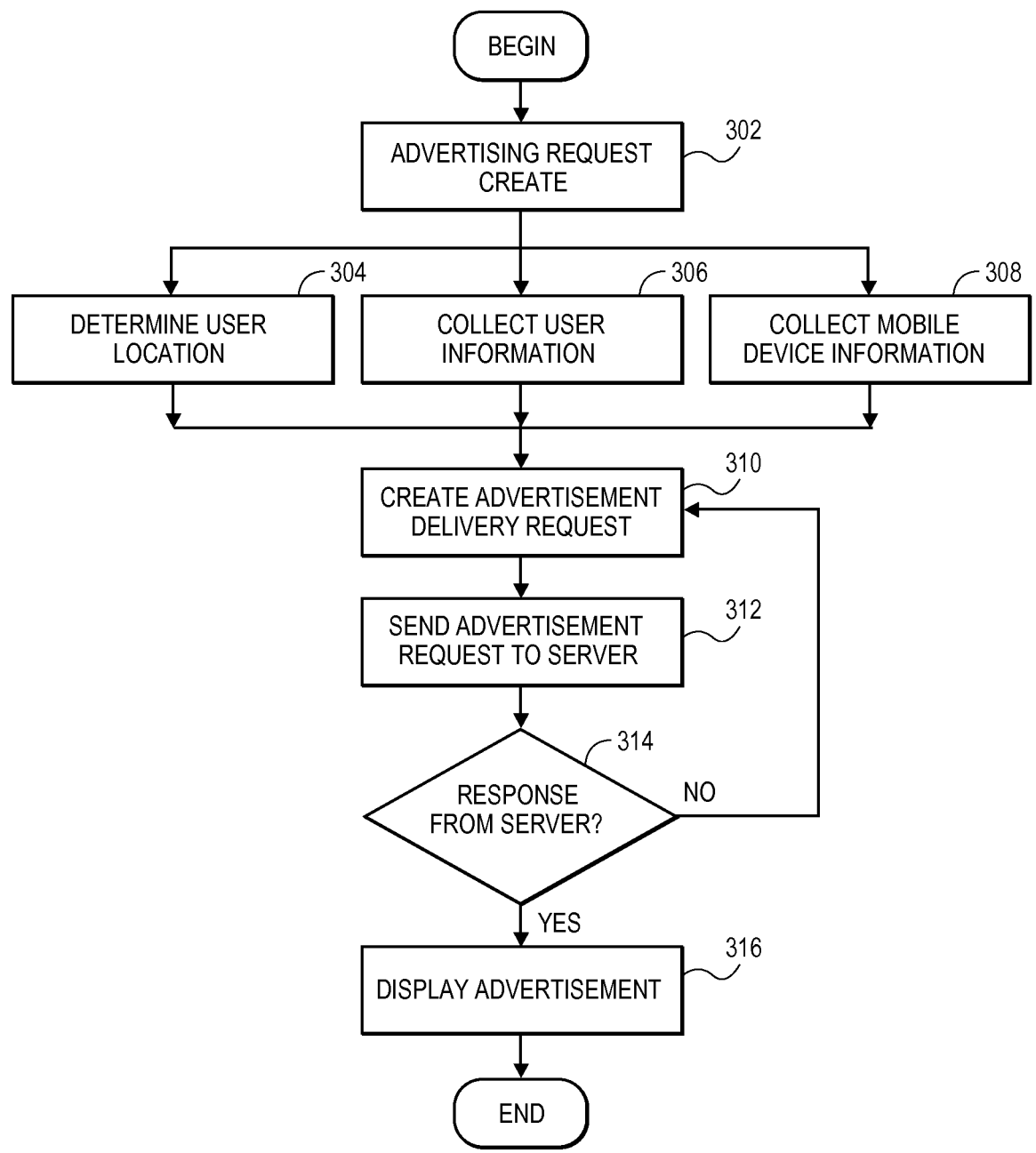
FIG. 3 is a flow diagram of a process of enabling the display of ads obtained via a mobile app outside of the app on the device display in accordance with one embodiment.
Figure 4:
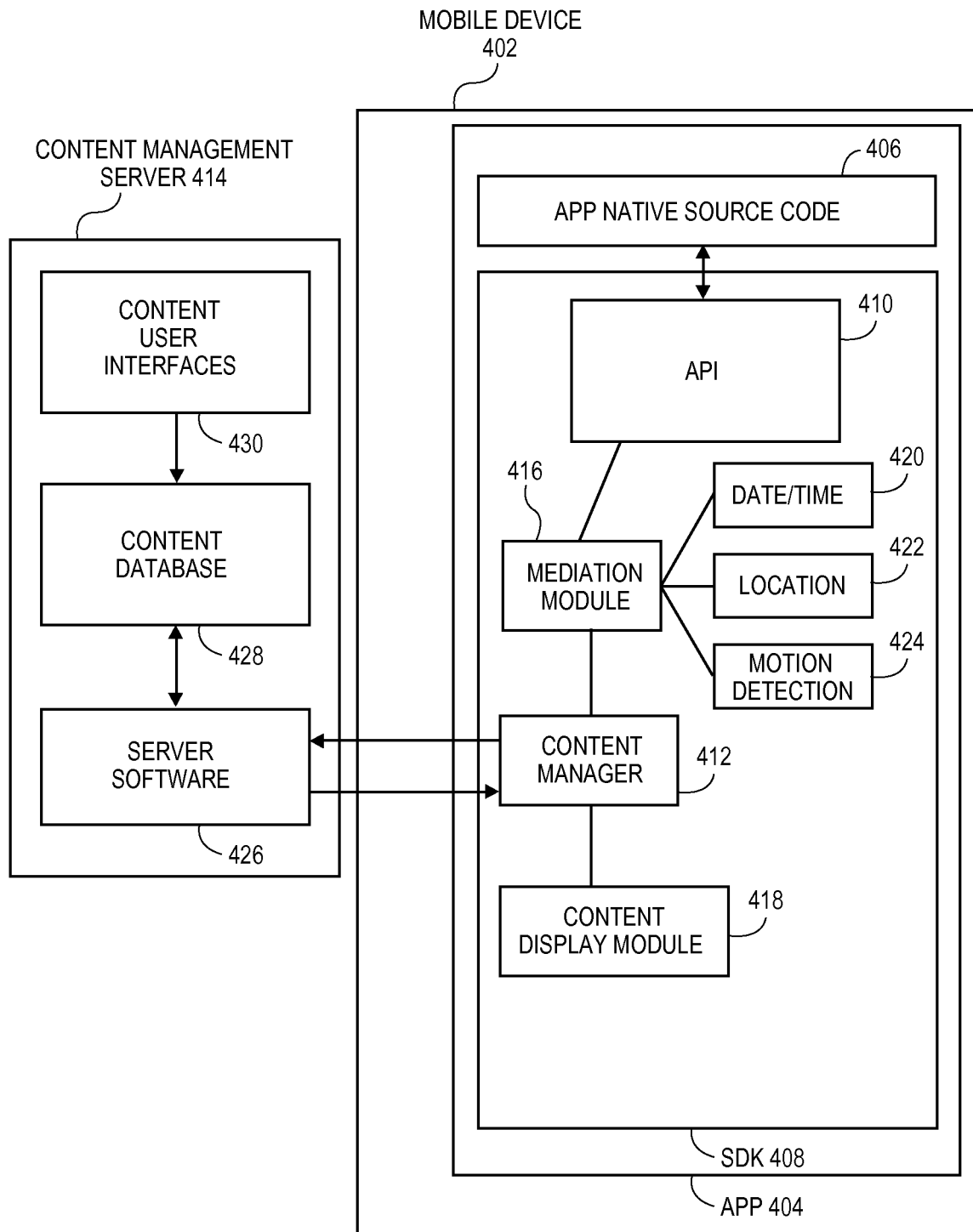
FIG. 4 is a block diagram showing numerous modules and components in a lock screen content display system of the present invention.
Figure 5:
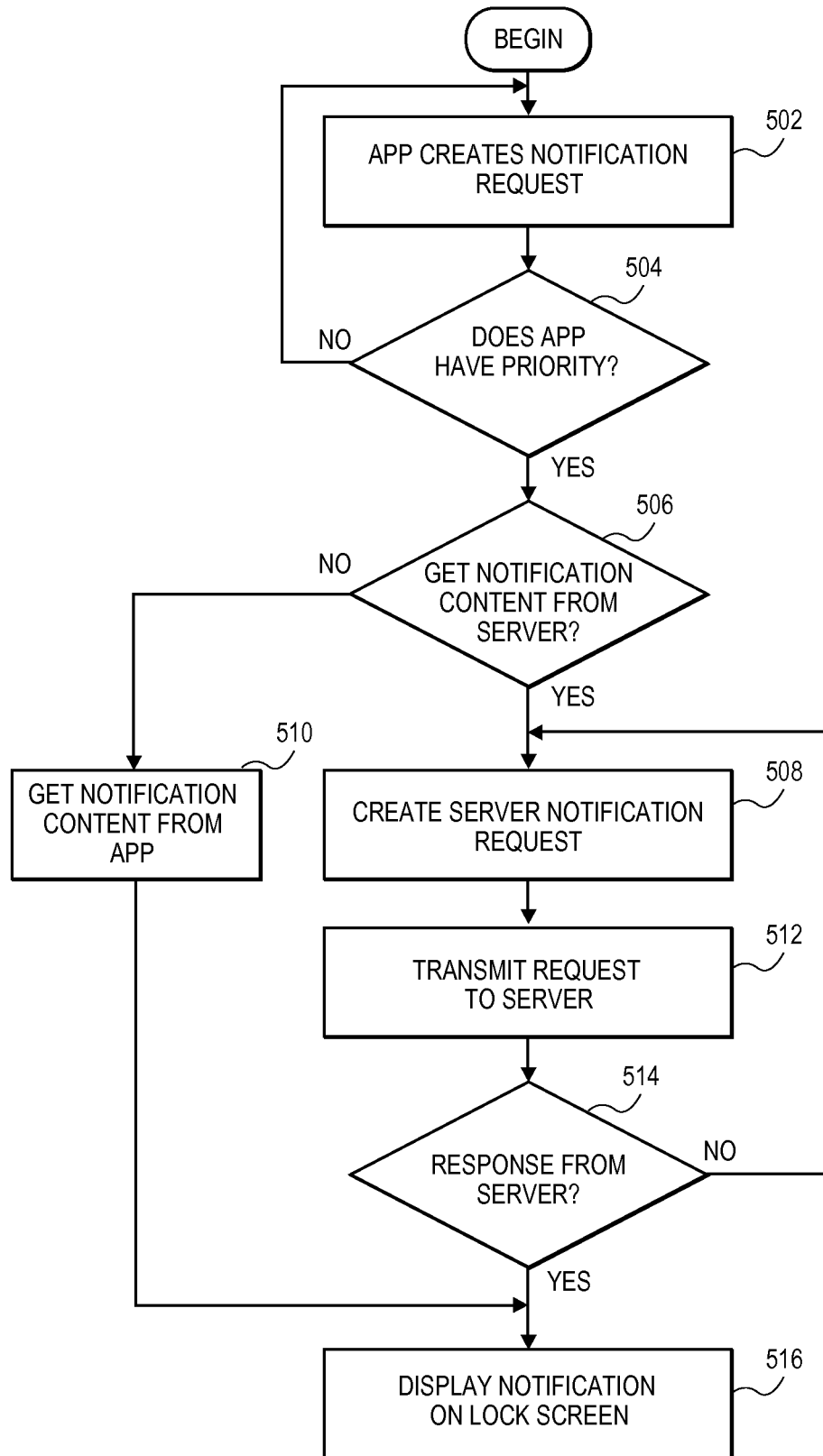
FIG. 5 is a flow diagram of a process of enabling display of content on a lock screen of a device in accordance with one embodiment of the present invention.

Example embodiments of a lock screen content display system for apps executing on a mobile device are described in FIGS. 4 and 5. Before these embodiments are described, a mobile ad delivery system is described in FIGS. 2 and 3. These examples and embodiments are provided solely to add context and aid in the understanding of the invention. Thus, it will be apparent to one skilled in the art that the present invention may be practiced without some or all of the specific details described herein. In other instances, well-known concepts have not been described in detail in order to avoid unnecessarily obscuring the present invention. Other applications and examples are possible, such that the following examples, illustrations, and contexts should not be taken as definitive or limiting either in scope or setting. Although these embodiments are described in sufficient detail to enable one skilled in the art to practice the invention, these examples, illustrations, and contexts are not limiting, and other embodiments may be used and changes may be made without departing from the spirit and scope of the invention.

Methods and system for displaying ads on a mobile device through execution of an app, wherein the ads may be displayed outside the confines of the app as displayed on the device screen are described in the various figures.

The present invention enables app developers to display ads through their apps to app users wherein such ads are displayed outside the confines of the actual app as displayed on the device. That is, the ad may be displayed as what may be characterized as a 'regular non-app generated' ad, such as on the device's home or lock screen (that is, display areas not normally associated with an app). These methods decrease clutter within mobile apps that are caused by the ads. Consequently, advertisers are more likely to pay higher rates thereby generating more revenue for app developers or related entities.

As noted, presently software developers designing mobile apps running on mobile devices can generally only display ads within the confines of the app itself. However, because of the limited screen size of many mobile devices, this constraint increases clutter within apps making it difficult for users to enjoy the app and forcing ads to be displayed in small and confined areas within the app. This, in turn, decreases the quality and appeal of this form of mobile advertising from the perspective of the advertisers, thereby driving down the economic value of such ads and negatively impacting revenues earned by software developers. Furthermore, revenues earned by software developers are limited because ads are no longer seen by users once a mobile app is shut down.

This invention, on the other hand, empowers mobile app developers to display ads to their users wherein the ads are displayed from outside of the confines of their mobile apps. This method decreases clutter within mobile apps due to ads, while still providing an outlet for apps to display ads to their users and earn revenue from advertisers or ad publishers.

Figure 1:
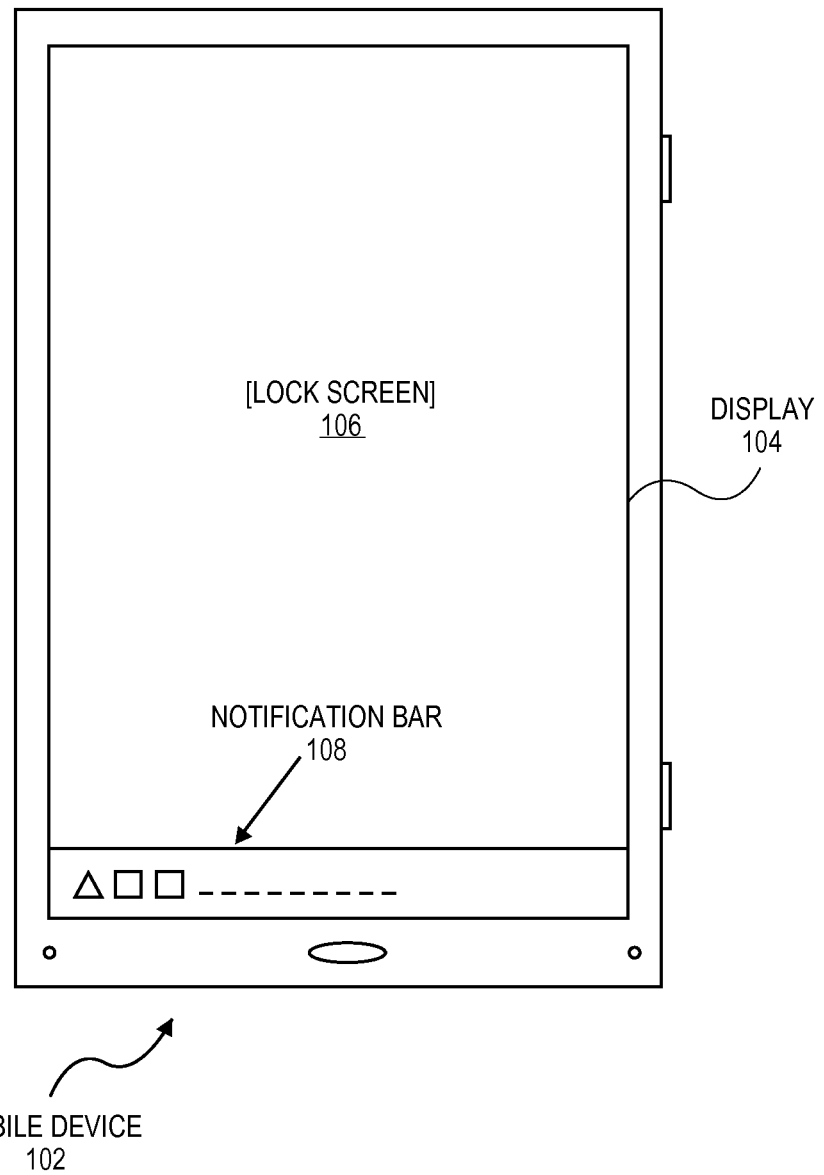
FIG. 1 is a block diagram showing a mobile device screen displaying conventional app notifications on a lock screen of the device.
Figure 2:
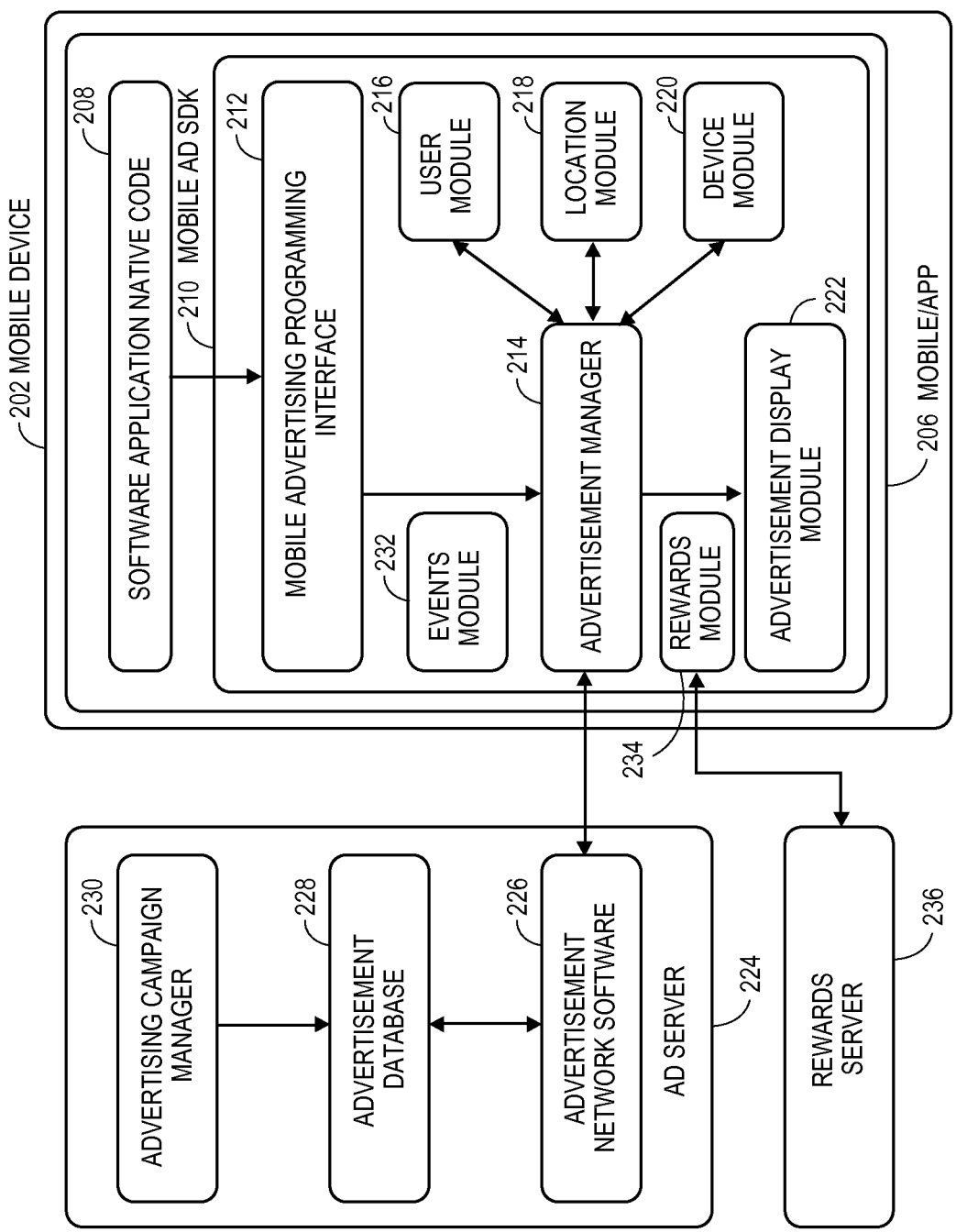
FIG. 2 is a block diagram showing numerous modules and components in the mobile ad delivery system of the present invention.

FIG. 2 is a block diagram showing numerous modules and components in the mobile ad delivery system of the present invention. At a high level, the system consists of two primary components: a mobile device 202, an ad server 224, and a rewards server 236. Embodiments of the present invention execute primarily on mobile device 202.

Figure 6A:
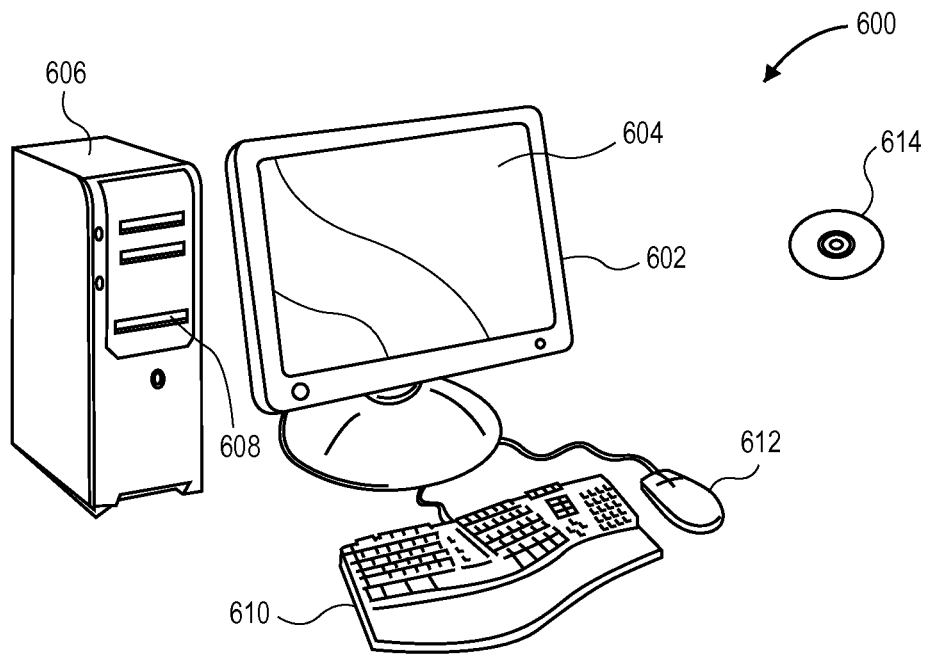
FIGS. 6A and 6B are block diagrams of a computing system, such as a mobile device or a server, suitable for implementing various embodiments of the present invention.
Figure 6B:
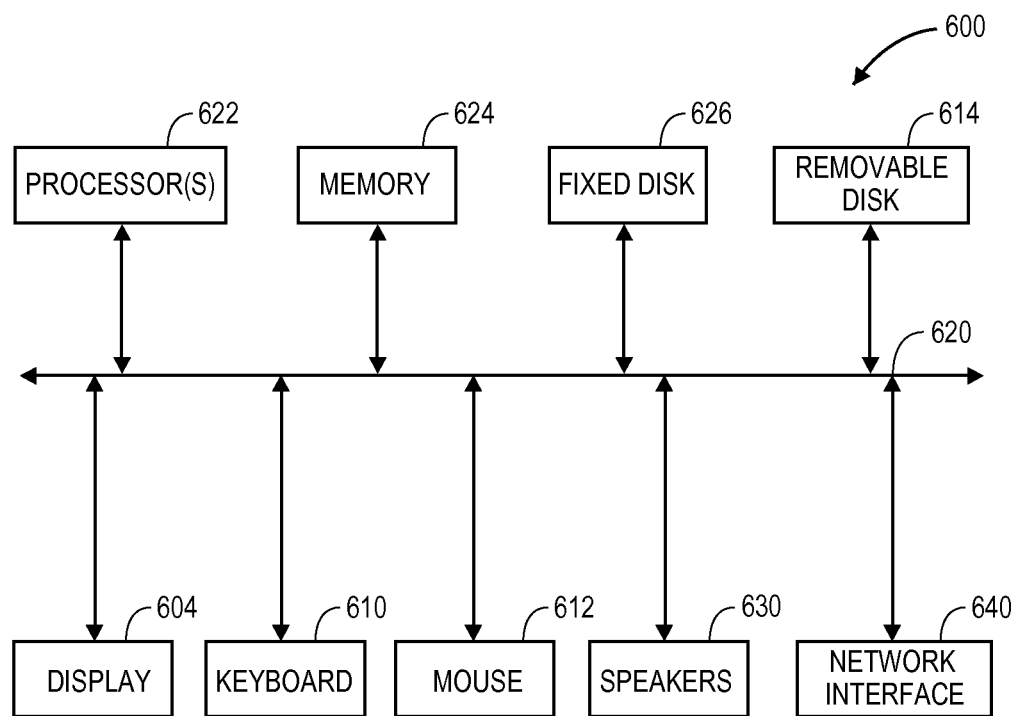

Mobile device 202, such as a mobile phone, tablet, or e-book reader, executes an app 206 using conventional components, such as those described in FIGS. 6A and 6B. App 206 is comprised of app source code 208 and is installed on mobile device 202. Software 208 incorporates or includes a mobile ad software development kit (SDK) 210.

Software development kit 210 includes several modules. One is a mobile ad programming interface (essentially an API) 212 which is in communication with an ad manager 214. Ad manager 214 transmits and receives data from three modules: a user module 216, a location module 218, and a device module 220. Ad Manager 214 also transmits data to an ad display module 222. SDK 210 communicates with app 206 (specifically, with source code 208) through API 212. SDK 210 communicates with an ad server 224 through ad manager 214. Ad server 224 runs ad network software 226 which sends and receives messages to and from ad manager 214. Ad server 224 also includes an ad database 228 and an ad campaign manager 230.

Mobile ad SDK 210 enables mobile app 206 to display ads on mobile device 202. The ads are displayed outside of app 206. As noted, SDK 210 contains mobile ad API 212 which presents a library of functions used by app source code 208. These functions are used to control the display of ads on mobile device 202.

Once app source code 208 signals mobile ad SDK 210 through API 212 to begin displaying ads, ad manager 214 collects information on the app/device user, such as gender and age, through user module 216, the geographical location of mobile device 202 through location module 218, and physical information relating to device 202, such as make and type, through device module 220.

This user, location and device information is packaged by ad manager 214 as an ad request and is sent to ad server 224. The ad request is picked up by ad network software 226 on ad server 224, where it is analyzed to determine the best possible ad that matches the user, location, and device information passed by ad manager 214.

If a suitable match is found, details on the ad are fetched from ad database 228 and returned to ad manager 214 which constructs the ad based on the details received. Ad manager 214 passes the result to ad display module 222 which, ultimately, displays the ad on mobile device 202 outside the confines of app 206. Ad database 228 is populated with entries by ad campaign manager 230 which allows advertisers to define ad campaigns through various parameters, such as duration, budget, demographics, and geography.

Mobile app 206 can disable ad on device 202 from outside of app 206 through mobile API 212 at any time. When this happens, ad manager 214 stops collecting information from user module 216, location module 218, and device module 220, and stops communicating with ad server 224. Consequently, ad display module 222 stops displaying ads on mobile device 202.

When integrating with mobile ad SDK 210, app 206 has the option of enabling ads on device 202 outside of app 206 by default or allowing the user to decide. In the latter case, only if the user opts into receiving ads outside of mobile app 206 are ad requests made to ad server 224. When ad requests are received by network software 226, it analyzes data sent with the ad request in order to determine the best ad to display given the parameters of the request. The resulting ad, if any, is then displayed on mobile device 202.

An app developer uses or integrates SDK 210 into a mobile app he or she is developing. Furthermore, corresponding ad server 224 infrastructure is created in order to efficiently and accurately respond to ad requests made by mobile ad SDK 210.

In other embodiments, user module 216, location module 218, and device module 220 are not needed. They may only be needed to enable ad campaigns to be targeted to certain user demographics, locations, and mobile device types.

An events module 232 can be added to mobile ad SDK 210 so that ad on device 202 can be refreshed at the occurrence of specific operating system events. For example, module 232 would allow ads appearing on the mobile device's home and lock screens to be refreshed every time device 202 is put to sleep and re-awakened.

A rewards module 234 can also be added to SDK 210 in order to reward users for accepting ads on their mobile devices. If app 206 does not enable mobile ads outside of app 206 by default, users could still decide to opt into receiving such ads in return for rewards from mobile app 206. For example, if mobile software app 206 is a game, users could be rewarded with the game's virtual currency, if available, for every extra day that they continue to receive ads on their mobile device outside of the game itself as displayed on the device.

Mobile app developers use ad SDK 210 of the present invention to integrate with app 206 by adding a few lines of code in their existing app source code 208. Once this is complete, app 206 can begin to display ads on the user's mobile device 202 from outside of the confines of app 206.

If reward module 234 is implemented in the system, mobile software developers wishing to reward their users for displaying ads on their mobile device outside of mobile software app 206 will need the infrastructure of their own rewards server 236 in place to keep track of individual users' rewards. Next, mobile software developers register the address of their rewards server 236 with reward module 234. Lastly, app developers implement additional code on their server 236 to handle callbacks from reward module 234 to update user reward balances every time a user is awarded a new reward.

FIG. 3 is a flow diagram of a process of enabling the display of ads obtained via a mobile app outside of the app on the device display in accordance with one embodiment. At step 302 an ad request is created in mobile app 206. At step 304 module 218 determines the app user's location. At step 306 module 216 collects app user information. At step 308 module 220 collects mobile device information.

At step 310 ad manager 214 creates a request for an appropriate ad in light of user, location and device and to meet the requirements of the ad request created at step 302. At step 312 the request for an appropriate ad is transmitted to ad server 224 using ad manager 214. Server 224 then searches for a suitable ad in database 228 using ad campaign manager 230. If server 224 is able to find a suitable ad for display on the mobile device, control goes to step 316 where the ad is displayed outside the confines of app 206. If server 224 does not find a suitable ad, control goes back to step 310 where another ad request is created. This continues until an ad is displayed on the device at which time the process is complete.

In another aspect of the present invention, methods and systems for mobile apps to display full screen or full page, media-rich, interactive content on a lock screen or home screen of a mobile device are described in FIGS. 4 and 5. Embodiments of the present invention improve user engagement with mobile apps when apps are not opened; that is, from outside the confines of the mobile apps. A mobile app is able to display full-page, media-rich, interactive content on a lock screen or home screen, thereby easily distinguishing itself from other mobile apps, and allowing users to interact with the content, such as notifications, without unlocking the device or leaving the lock/home screen.

As noted, conventional practice typically limited mobile app developers to relying on content, such as app notifications, consisting of a single icon to convey messages to users when outside the app. Embodiments of the present invention empower mobile apps to utilize the rich-media technologies to communicate with its users via this same type of content.

One specific example or use case of displaying content on a lock screen as implemented by the present invention is the display of app notifications on a lock screen or home screen. In the described embodiment and as noted above, mobile notifications are designed for exactly what their name suggests: notifying users, typically about simple events related to a specific app, such as a reminder, a completed data transmission, an update and the like. Note that none of these require or invite interaction with the app by the user. They were not designed to engage or re-engage users with mobile app content when the app itself is not opened. As a result, such notifications have a very low engagement rate amongst users, generally because such notifications do not have the appeal or draw needed for users to interact or engage with the apps, specifically, they do not motivate users to open the app and see what the notification is about.

As noted, an app notification is a specific type of content and is used to illustrate implementation of one embodiment of the present invention. Methods and systems described herein can be used to display other more general types of content on a device lock screen. For example, a CNN app may display notification content and more general content on a screen of a device when the app is closed, specifically on a lock screen or home screen of a device (herein referred to as "lock screen"). The app may maintain a list of the latest news items on the lock screen. This list is always maintained and updated by the CNN app and, with the invention enabled, is always displayed on the lock screen of the mobile device. The app may also only display breaking news on the lock screen, more in line with a notification type of content. In this case, the app would only display the breaking news on the lock screen (i.e., a notification) but would provide more interactive, media rich content than a conventional notification. The CNN app may also display both types of content on the lock screen, that is, have a constant display of news items and the occasional display of breaking news.

In the described embodiment, notification content can be modified immediately ("on-the-fly") by the app publisher or developer and as desired or at-will by the app itself even when the app is not opened. The app can perform operations to modify its notifications in real time.

FIG. 4 is a block diagram showing numerous modules and components in the mobile app notification system of the present invention. Several of these modules and components are similar to those shown in FIG. 2 and others are specifically for displaying media-rich, descriptive, and interactive notifications (herein also referred to as "content" or "notification content") of the present invention.

At a high level, the app content display system consists of two primary components: a mobile device 402 and a notification content management server 414. Embodiments of the present invention execute primarily on mobile device 402. Mobile device 402 executes an app 404 using conventional components, such as those described in FIGS. 6A and 6B. App 404 includes an app source code module 406 and is installed on mobile device 402. App source code module 406 (i.e., the primary or native app software) communicates with an app notification content software development kit (SDK) 408. This SDK 408 creates the interactive, media-rich notification content displayed by app 406 on a lock screen or home screen of device 402.

The primary operations of the app notification system that execute on mobile device 402 are performed by SDK 408 comprised of various modules. As with mobile ad SDK 210, SDK 408 has two modules used for communicating with external modules or components: notification content programming interface (API) 410 and a notification content manager 412. As noted, API 410 is used to communicate with the app's main source code 406. In one embodiment, notification content manager 412 is used by SDK 408 to communicate with a notification content management server 414, described below. Within SDK 408, notification content manager 412 is in communication with a mediation module 416 and a notification content display module 418. In one embodiment, mediation module 416 is in communication with three modules: a date/time module 420, a location module 422, and a motion module 424.

It may be noted here that mediation module or layer 416, a critical module in SDK 408, prevents a common problem caused by conventional independent 'lock screen replacement' apps that take control of a device's lock screen functionality. The problem arises if there are two or more of these replacement apps on a device in which case the apps essentially compete with each other. For example, if there is a Custom Lock Screen A and Custom Lock Screen B installed on a device, they will overlap, requiring the user to have to unlock the device twice to dismiss both custom lock screens. This problem can be avoided with the use of mediation layer 416 which mediates between different apps wanting or requesting access to the lock screen through SDK 408 of the present invention, thereby avoiding the overlap and multiple unlocking issues presented by conventional lock screen replacement apps.

In one embodiment, the system includes a notification content management server 414 comprised of three components relevant to the present invention. One is primary software running server 414, notification content server software 426 which sends and receives data from mobile device 402. Device 402 uses notification content manager 412 via the Internet (or other suitable network) for communicating with server software 426. Server software 426 communicates with a content database 428 which stores the interactive, media-rich notification content of the present invention. In the described embodiment, this database catalogues content according to, but not limited to, type of content (whether an image, HTML, video, etc.), time of creation, and target audience, target location, desired date and time of notification or content display, and desired motion pattern of the device (such as jogging, driving, etc.). A content user interface 430 allows a user to design the visual content of the notifications or other content, define its target audience, and transmit this data to database 428.

As with SDK 210, an app developer integrates SDK 408 into a mobile app thereby enabling the app notification content processes as described in the present invention. This SDK component enables mobile app 404 to display content on the lock screen or home screen of device 402, even when the app has not been opened by the user. Mobile app developers and publishers can integrate SDK 408 into app 404 by adding a few lines of code into app source code 406. Once this is complete, app 404 can send notification content as illustrated in the described embodiment in the present invention to the device home screen or lock screen.

FIG. 5 is a flow diagram of a process of displaying notification content from an app on a lock screen of a device in accordance with one embodiment. Notification content SDK 408 includes API 410 which makes available a function library that can be used by app source code 406 to control the display of notification content on a lock screen of a device. When app source code 406 signals SDK 408 via API 410 that the app has content it wants to display, mediation module 416 is invoked. Module 416 verifies whether app 404 has permission or clearance to display the content on the device's lock screen.

Before the process of FIG. 5 begins, the user has turned on the functionality of the present invention by enabling display of notifications and other types of content on a lock screen or home screen. In one embodiment, this may be done when the user downloads and initially configures the app, or switches it on as desired when using the app. It may be noted that even if an app has the functionality of the present invention (i.e., SDK 408 has been integrated into it), the user may choose to keep conventional functionality and have simple icon notifications displayed.

The process begins at step 502 where the app makes a request to display notification content on a lock screen. This request (which would be created in a conventional notification system as well) is transmitted from app native source code to the SDK via the API.

At step 504 the notification content SDK executes and determines whether the app has clearance to display the content as requested. In one embodiment, it determines whether the app has priority to display the content on the lock screen. There may be multiple apps that want to display notifications and other content and therefore priorities for each of these apps must be determined.

Mediation module computes the priority of apps to display notification content. It first examines the position of the app in a content queue, a component of the SDK of the present invention. An app's position in this content queue is based on the order in which notification content requests were made to the SDK. It may also examine how frequently an app is used by the user. Apps that are used more frequently by a user are given a higher priority. Notifications and other content may also have constraints with respect to date and time, geographic location or how the user handles the devices (i.e., device motion patterns as dictated by the user). That is, these factors or constraints may be examined in determining whether content is displayed on a lock screen. Apps that request to display notification contnet that have all their constraints (date, time, location, etc.) satisfied are also given a higher priority.

If the app does not have priority (i.e., has a low position in the content queue) as determined at step 504, the SDK informs the app that its request for displaying a notification on the lock screen is denied and control returns to step 502 where the app can make another request. The app can keep trying until the SDK, specifically the mediation module, determines that the app has priority at step 504 at which point control goes to step 506. The mediation module has cleared the app thereby allowing it to display a notification on the lock screen.

At step 506 the notification content manager in the SDK obtains the content to be displayed. The content that constitutes the notification may be a full-screen, interactive, and engaging display (in contrast to the small icon of conventional notifications). It may be obtained from either the content server or from the app itself on the mobile device. A flag in the app source code directs the app source code with respect to the source of the content. In the latter embodiment, various types of content may be embedded or stored in the app source code during app development. The content manager in the SDK determines where to obtain the content from based on parameters set through the API.

If the notification content is fetched from a content management server via the Internet or other network, control goes to step 508. If not, control goes to step 510 where notification content is obtained from the app. If the content is fetched from the server, the content manager packages or creates a request at step 508.

In one embodiment, besides containing version and other information relating to the app itself, the request contains information on the app user, date, time, location, and motion pattern of the device at the time the notification is being made (i.e., the time at which the request is being packaged). It also contains the type of notification content requested by the app. In many cases, an app may have only one standard notification that it sends to a lock screen. Some apps may have different types of notifications and content, such as for reminders, alerts, data transmissions, and the like. Upon implementing this invention, app developers may want to have various types of content that can be sent to a lock screen. Recall that the notification content request is being formed by an SDK in the app itself or, more specifically, by an SDK in communication with app source code, as described above.

At step 512 the request is transmitted to the content server. There it is examined by content server software which identifies content in the database that matches the request made by the notification manager. This content must be associated with the app making the request, and match the date and time contained in the request, geographic location, and motion pattern constraints if applicable. If the software finds a match, details on the content (e.g., the notification display) are obtained from a content database on the server. These details include, but are not limited to, resources such as text, images, HTML pages, videos, and other content used in the notification, and URLs used to track impressions and user engagement with the notifications and other types of content. The database stores data, or has access to data, relating to a content user interface for the various apps. The content user interface allows app developers and publishers to define specific notification content (e.g., videos, graphics, text, images, and other design elements) to be displayed on the device. When and what is displayed is based on specific app events, as described above, as well as user location, day/time, device motion patterns, and demographics. The content server software then constructs the actual notification content (e.g., HTML, text/image combination, video, button icon, etc.) which is displayed on the mobile device lock screen.

At step 514 the notification manager in the SDK determines whether there is a response from the content server. If there is no response, control goes back to step 508 where a new request is created. If there is a response from the content server, control goes to step 516 where the notification content is displayed on the lock screen or home screen of the device.

The content database stores data related to one or more user notification interfaces, along with other data. As noted, each app can have one or more notification displays. These interfaces allow mobile app developers and publishers to define specific notification and other types of content to be displayed based on certain app events, reminders, statuses, and the like, as well as user location, demographics, and device motion patterns.

The notification and content display methods of the present invention may be enabled or disabled by the device user when the SDK is integrated into the app. The notification feature may be enabled by default. The API may be used by the app to disable displaying notification content on a mobile device's lock screen. When this happens, the mediation module stops collecting information from the date/time module, location module, and motion module. Because notification has been disabled, the content manager stops communicating with the notification content management server. Consequently, the notification display module stops displaying content on the lock screen of the mobile device. Only if the user opts into receiving notifications from the app on the lock screen are content requests, as described above, transmitted to the mediation module, content manager, and content management server. When requests are received by the server software, it analyzes the data sent with the request in order to determine the best content to display given the parameters of the request. The resulting notification content, if any, is then displayed on the mobile device.

In other embodiments, the date/time module, location module, and motion module are not needed to implement the present invention. As described above, these modules may be used to calibrate the prioritization of notification requests coming from different apps.

In another embodiment, the content management server is not required to implement the present invention. It allows app developers to modify in an ad hoc manner notification content to be displayed on a device's lock screen, but is not required in order to get the benefits of the content display system of the present invention.

In another embodiment, an events module may be added to the SDK. This would allow for new content can be displayed on the lock screen of the mobile device at the occurrence of specific operating system events, such as every time that the mobile device is put to sleep and reawakened.

In one embodiment, an app developer integrates the SDK into the app source code. The SDK is made available to the developer or publisher from a service provider. Furthermore, the notification content server infrastructure may be provided in order to accurately respond to content requests made by the SDK.

FIGS. 6A and 6B illustrate a computing system 600 suitable for implementing embodiments of the present invention. FIG. 6A shows one possible physical form of the computing system. Of course, the computing system may have many physical forms including a small handheld device, such as a mobile phone or tablet. Computing system 600 includes a monitor 602, a display 604, a housing 606, a disk drive 608, a keyboard 610 and a mouse 612. Disk 614 is a computer-readable medium used to transfer data to and from computer system 600.

FIG. 6B is an example of a block diagram for computing system 600. Attached to system bus 620 are a wide variety of subsystems. Processor(s) 622 (also referred to as central processing units, or CPUs) are coupled to storage devices including memory 624. Memory 624 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 626 is also coupled bi-directionally to CPU 622; it provides additional data storage capacity and may also include any of the computer-readable media described below. Fixed disk 626 may be used to store programs, data and the like and is typically a secondary storage medium (such as a hard disk) that is slower than primary storage. It will be appreciated that the information retained within fixed disk 626, may, in appropriate cases, be incorporated in standard fashion as virtual memory in memory 624. Removable disk 614 may take the form of any of the computer-readable media described below.

CPU 622 is also coupled to a variety of input/output devices such as display 604, keyboard 610, mouse 612 and speakers 630. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 622 optionally may be coupled to another computer or telecommunications network using network interface 640. With such a network interface, it is contemplated that the CPU might receive information from the network, or might output information to the network in the course of performing the above-described method steps. Furthermore, method embodiments of the present invention may execute solely upon CPU 622 or may execute over a network such as the Internet in conjunction with a remote CPU that shares a portion of the processing.

Although illustrative embodiments and applications of this invention are shown and described herein, many variations and modifications are possible which remain within the concept, scope, and spirit of the invention, and these variations would become clear to those of ordinary skill in the art after perusal of this application. Accordingly, the embodiments described are to be considered as illustrative and not restrictive, and the invention is not to be limited to the details given herein, but may be modified within the scope and equivalents of the appended claims.

What is claimed is:

1. An ad system for displaying mobile ads on a mobile device of a user, the ad system comprising:

a mobile application (app) configured to be provided, via a network, to the mobile device for installation on the mobile device, wherein the mobile app comprises a mobile graphic user interface (GUI), and native app source code and a software development kit (SDK) are installed on the mobile device, wherein the SDK is configured to integrate with the native app on the mobile device via the native app source code added to the native app that communicates with the SDK via an application programming interface (API) to render ads inside and outside the mobile GUI, and wherein the mobile app is configured to display mobile ads to a device screen of the mobile device; and a server, the server communicatively coupled to the mobile device via the network, and the server configured to transmit one or more mobile ads to the mobile device, wherein the server is further configured to track a reward associated with the user, wherein the reward is tracked from when the user enables the mobile device to receive mobile ads outside of the mobile GUI, and wherein receipt of the one or more mobile ads at the mobile device causes the mobile app to display the one or more mobile ads outside of the mobile GUI of the mobile app, and wherein the one or more mobile ads are configurable to be displayed outside the confines of the mobile GUI when the mobile app is closed, but where the SDK remains executing on a same processor of the mobile device that executes the mobile app for displaying the GUI, and as displayed on the display screen of the mobile device.

2. The ad system of claim 1, wherein enabling the mobile device to receive one or more mobile ads includes receiving, at the server, an opt-in request from the mobile app via the network, the opt-in request including an acceptance indicator causing the server to associate the reward with a user, wherein the acceptance indicator indicates the user's acceptance to receive the one or more mobile ads at the mobile device.

3. The ad system of claim 1, wherein the server is further configured to receive user-device information from the mobile device via the network, the user-device information causing the server to determine the one or more mobile ads based on the user information.

4. The ad system of claim 3, wherein the user-device information includes one or more of: a gender of the user, an age of the user, or a geographic location of the user.

5. The ad system of claim 3, wherein the user-device information includes one or more of: a make of the mobile device or a type of the mobile device.

6. The ad system of claim 1, wherein the one or more mobile ads are refreshed based on an occurrence of one or more specific operating system events.

7. The ad system of claim 6, wherein the one or more specific operating system events include any of: when the mobile device is put to sleep or when the mobile device is reawakened.

8. The ad system of claim 1, wherein the device screen is a home screen of the mobile device.

9. The ad system of claim 1, wherein the device screen is a lock screen of the mobile device.

10. The ad system of claim 1, wherein the server tracks a reward associated with the user via a record maintained at the server.

11. An ad method for displaying mobile ads on a mobile device of a user, the ad method comprising:
   transmitting one or more mobile ads to a mobile device of a user;
   displaying the one or more mobile ads outside of a mobile graphic user interface (GUI) of a mobile application (app) to a device screen of the mobile device, the mobile app provided, via a network, to the mobile device and installed on the mobile device, wherein the mobile app comprises the mobile GUI, and native app source code and a software development kit (SDK) are installed on the mobile device, wherein the SDK is configured to integrate with the native app on the mobile device via the native app source code added to the native app that communicates with the SDK via an application programming interface (API) to render ads inside and outside the mobile GUI, wherein the one or more mobile ads are configurable to be displayed outside the confines of the mobile GUI when the mobile app is closed, but where the SDK remains executing on a same processor of the mobile device that executes the mobile app for displaying the GUI, and as displayed on the display screen of the mobile device, and
   tracking a reward associated with the user, wherein the reward is tracked from when the user enables the mobile device to receive mobile ads outside of the mobile GUI.

12. The ad method of claim 11, wherein enabling the mobile device to receive one or more mobile ads includes receiving, at a server, an opt-in request from the mobile app via the network, the opt-in request including an acceptance indicator causing the server to associate the reward with a user, wherein the acceptance indicator indicates the user's acceptance to receive the one or more mobile ads at the mobile device.

13. The ad method of claim 11, wherein a server receives user-device information from the mobile device via the network, the user-device information causing the server to determine the one or more mobile ads based on the user information.

14. The ad method of claim 13, wherein the user-device information includes one or more of: a gender of the user, an age of the user, or a geographic location of the user.

15. The ad method of claim 13, wherein the user-device information includes one or more of: a make of the mobile device or a type of the mobile device.

16. The ad method of claim 11, wherein the one or more mobile ads are refreshed based on an occurrence of one or more specific operating system events.

17. The ad method of claim 16, wherein the one or more specific operating system events include any of: when the mobile device is put to sleep or when the mobile device is reawakened.

18. The ad method of claim 11, wherein the device screen is a home screen of the mobile device.

19. The ad method of claim 11, wherein the device screen is a lock screen of the mobile device.

20. The ad method of claim 11, wherein a server tracks a reward associated with the user via a record maintained at the server.

* * * * *